(12) United States Patent
Su (10) Patent No.: US 8,369,460 B1
(45) Date of Patent: Feb. 5, 2013

(54) REDUCED COMPLEXITY CONSTELLATION PATTERN RECOGNITION AND CLASSIFICATION METHOD

(75) Inventor: Wei Su, Englishtown, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 924 days.

(21) Appl. No.: 12/454,492

(22) Filed: May 18, 2009

(51) Int. Cl.
    *H04L 27/06* (2006.01)
(52) U.S. Cl. ........ 375/340; 375/262; 375/341; 382/181; 382/199; 382/226
(58) Field of Classification Search ........... 375/340, 375/341, 349, 350, 262, 265; 382/165, 170, 382/181, 190, 191, 199, 200, 225, 226, 229
    See application file for complete search history.

(56) References Cited

U.S. PATENT DOCUMENTS

| | | | | |
|---|---|---|---|---|
| 5,946,415 | A * | 8/1999 | Su et al. | 382/190 |
| 7,379,507 | B2 * | 5/2008 | Chen et al. | 375/267 |
| 7,933,449 | B2 * | 4/2011 | Natori | 382/181 |
| 2002/0051501 | A1 * | 5/2002 | Demjanenko et al. | 375/298 |

* cited by examiner

*Primary Examiner* — Dac Ha
(74) *Attorney, Agent, or Firm* — Stephen J. Harbulak (57) ABSTRACT

A simplified, highly accurate, and real-time constellation pattern recognition and classification device for a software-defined communications apparatus is provided. The constellation pattern recognition and classification device includes an r(k) input, a group of test functions, a means for estimating, a means for calculating, a means for selecting the optimal test function, a means for signal processing, and a means for classifying a pattern that substantially decreases the amount of current constellation pattern calculations and intensive computational requirements and provides a real-time rapid response that improves performance of the software-defined communications apparatus. The present invention also includes a simplified, highly accurate, and real-time constellation pattern recognition and classification article of manufacture with a storage medium encoded with machine-readable computer program code for a software-defined communications system and a method for highly accurate and real-time reduced complexity constellation pattern recognition and classification for a software-defined communications system.

18 Claims, 4 Drawing Sheets

REDUCED COMPLEXITY CONSTELLATION PATTERN RECOGNITION AND CLASSIFICATION METHOD

GOVERNMENT INTEREST

The invention described herein may be manufactured, used, imported, sold, and licensed by or for the Government of the United States of America without the payment to me of any royalty thereon.

FIELD OF THE INVENTION

The invention generally relates to modulation of communications signals. In particular, the invention relates to devices and methods for the modulation of communications signals used for blind demodulation of cognitive radios.

BACKGROUND OF THE INVENTION

Constellation pattern recognition is an important technique that has been used in digital image processing, digital signal processing, and digital communications. It is a statistical technique for recovering a constellation pattern from noisy data inputs by matching the noisy inputs against known alphabet sets. A two-dimensional image or a communication data symbol can be represented by a complex number, and a set of those complex numbers can form a two-dimensional pattern. These two-dimensional patterns include the binary phase-shift-keying, quadrature phase-shift-keying, and 16-ary quadrature-amplitude-modulation constellation patterns depicted in FIGS. 1A-1C. The FIGS. 1A-1C constellation patterns are plotted using an in-phase coordinator for real numbers and a quadrature coordinator for imaginary numbers.

Figure 1A:
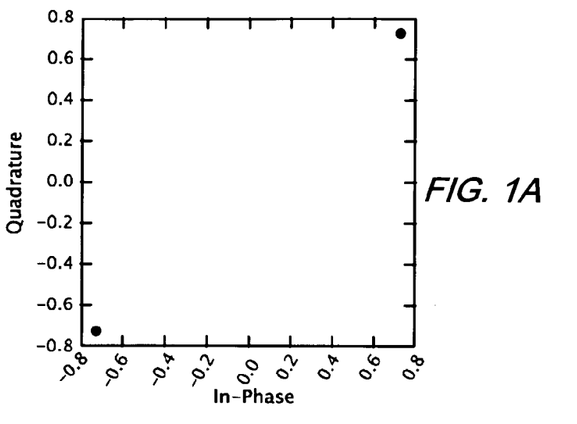
FIG. 1A illustrates a binary phase-shift-keying (BPSK) constellation pattern.
Figure 1B:
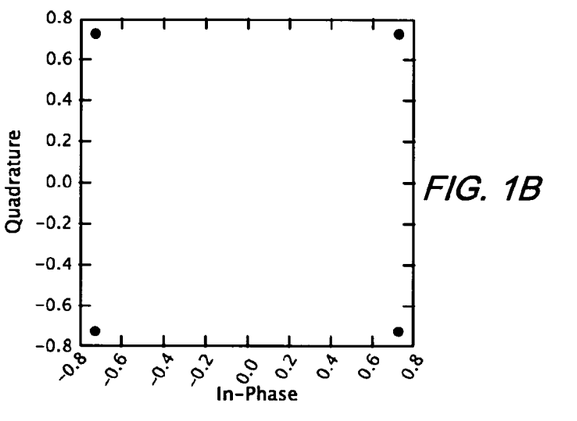
FIG. 1B illustrates a quadrature phase-shift-keying (QPSK) constellation pattern.
Figure 1C:
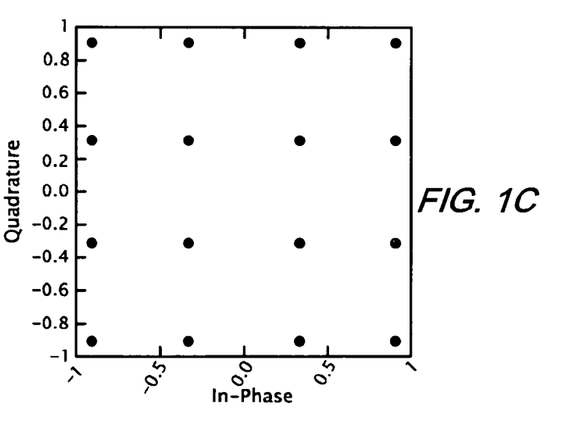
FIG. 1C illustrates a 16-ary quadrature-amplitude-modulation (QAM) constellation pattern.

FIG. 1A depicts a binary phase-shift-keying (BPSK) constellation pattern, which has 2 alphabets evenly distributed on a circle. FIG. 1B depicts a quadrature phase-shift-keying (QPSK) constellation pattern with four alphabets evenly distributed on a circle. FIG. 1C is a 16-ary quadrature-amplitude-modulation (QAM) constellation pattern with 16 alphabets evenly distributed on a square. The average power of the constellation alphabets are normalized to one.

Constellation pattern recognition is a statistical method to recover a constellation pattern from noisy data inputs by matching the noisy data inputs to known alphabet sets. Assume that there are L number of constellation pattern candidates and that the $i^{th}$ (i=1, 2, ..., L) pattern candidate has $M_i$ constellation alphabets denoted by complex numbers $\{b_1^{(i)}, b_2^{(i)}, \ldots, b_{M_i}^{(i)}\}$. A number of prior art statistical classification techniques have been developed, such as the Average Likelihood Ratio Test, Generalized Likelihood Ratio Test, Hybrid Likelihood Ratio Test, and higher order techniques.

One widely used statistical classifier used in prior art constellation pattern recognition is the Average Likelihood Ratio Test (ALRT). The ALRT statistical classifier recognizes the unknown constellation pattern by maximizing the logarithmic probability density functions as follows:

$$l_a(H_i | r(k)) = \sum_{k=1}^{K} \log\{p(H_i | r(k))\} \quad (1)$$

under the hypothesis that $H_i$, i=1, 2, ..., L for L number of constellation pattern candidates, where $$p(H_i | r(k)) = \frac{1}{M_i} \sum_{j=1}^{M_i} \exp\left\{-\frac{\|r(k) - b_j^{(i)}\|^2}{2\sigma^2}\right\} \quad (2)$$

is the probability density of the unknown random variable r(k) averaged over $M_i$ alphabets at the instance k. Therefore, the $i^{th}$ constellation pattern will be chosen if the $i^{th}$ test function $l_a(H_i|r(k))$ is a maximum. In other words, the noisy input is classified to have the constellation pattern match the $i^{th}$ hypothetical pattern. The other two well known likelihood ratio test methods are Generalized Likelihood Ratio Test (GLRT) and Hybrid Likelihood Ration Test (HLRT). For the GLRT, the noisy data inputs are considered deterministic and unknown, and the maximum likelihood test is used for classification. This method generally yields easier to implement classifiers than the ALRT but it suffers from the nesting problem, which can lead to a failure in uniquely classifying nested patterns.

Under the HLRT technique, the classification is accomplished by combining ALRT and GLRT together. This method avoids the nested constellation problem in GLRT but it can be complicated due to the multi-dimensional maximization required. Higher-order cyclic stationary and higher-order cumulants were also used for classifying the constellations of the communication signals. However, those methods usually require a large amount of data for the statistical analysis and are very computationally expensive.

While the prior art ALRT system has performed many valuable functions, it is still beset by a number of difficulties and shortcomings related to its multiple exponential and logarithmic calculations. These ALRT calculations are very computation intensive, tedious, and extremely time-consuming. In fact, current ALRT systems are so computation-intensive, tedious, and time-consuming that they are not feasible for real-time recognition operations in the adaptive demodulation of software radio. Currently, the modulation classification is conducted by taking snapshots of the data. Since the content of the data is of interest, the classification processing can be performed in between two snapshots which is usually a large time interval. While in the adaptive demodulation case, the classification is performed to the signal, one block after another. The classification processing of the current block has to be done promptly in a very short time interval before the next block comes. Thus, there has been a long-felt need for faster modulation classification processing to satisfy the quality of service in real-time software radio communication applications that has not been met by prior art constellation pattern recognition systems.

Up until now, the long-felt needs for simplified and more rapid constellation pattern recognition systems have not been met.

SUMMARY OF THE INVENTION

In order to answer the long-felt need for a more rapid and simplified constellation pattern recognition device that provides a real-time modulation classification, this invention provides a simplified, highly accurate, and real-time constellation pattern recognition and classification device that does not suffer from the limitations, shortcomings, and difficulties of prior art constellation pattern recognition devices.

The reduced complexity constellation pattern recognition and classification device comprises a group of test functions and a means for classifying a pattern that provides a simplified, highly accurate, and real-time constellation pattern recognition and classification device that does not suffer from the limitations, shortcomings, and difficulties of the ALRT-based prior art constellation pattern recognition devices.

It is another object of the present invention to provide a highly accurate and real-time reduced complexity constellation pattern recognition and classification system with a group of test functions, a means for estimating, a means for selecting the optimal test function, and a means for classifying a pattern.

It is yet another object of the present invention to provide a method for highly accurate and real-time reduced complexity constellation pattern recognition and classification for a software-defined communications system with estimating, selecting, and classifying steps.

It is still a further object of the present invention to provide a simplified, highly accurate, and real-time constellation pattern recognition and classification article of manufacture with a storage medium encoded with machine-readable computer program code for a software-defined communications system with a means for estimating, a means for selecting the optimal test function, and a means for classifying a pattern.

These and other objects and advantages can now be attained by this invention's reduced complexity constellation pattern recognition and classification device for software radios comprising an r(k) input, a group of test functions, a means for estimating, a means for calculating, a means for selecting the optimal test function, a means for signal processing, and a means for classifying a pattern that answers the long-felt need for decreasing the numerous constellation pattern calculations and intensive computational requirements and providing a real-time rapid response unmet by prior art constellation pattern recognition systems.

DETAILED DESCRIPTION OF THE DRAWINGS

Figure 2:
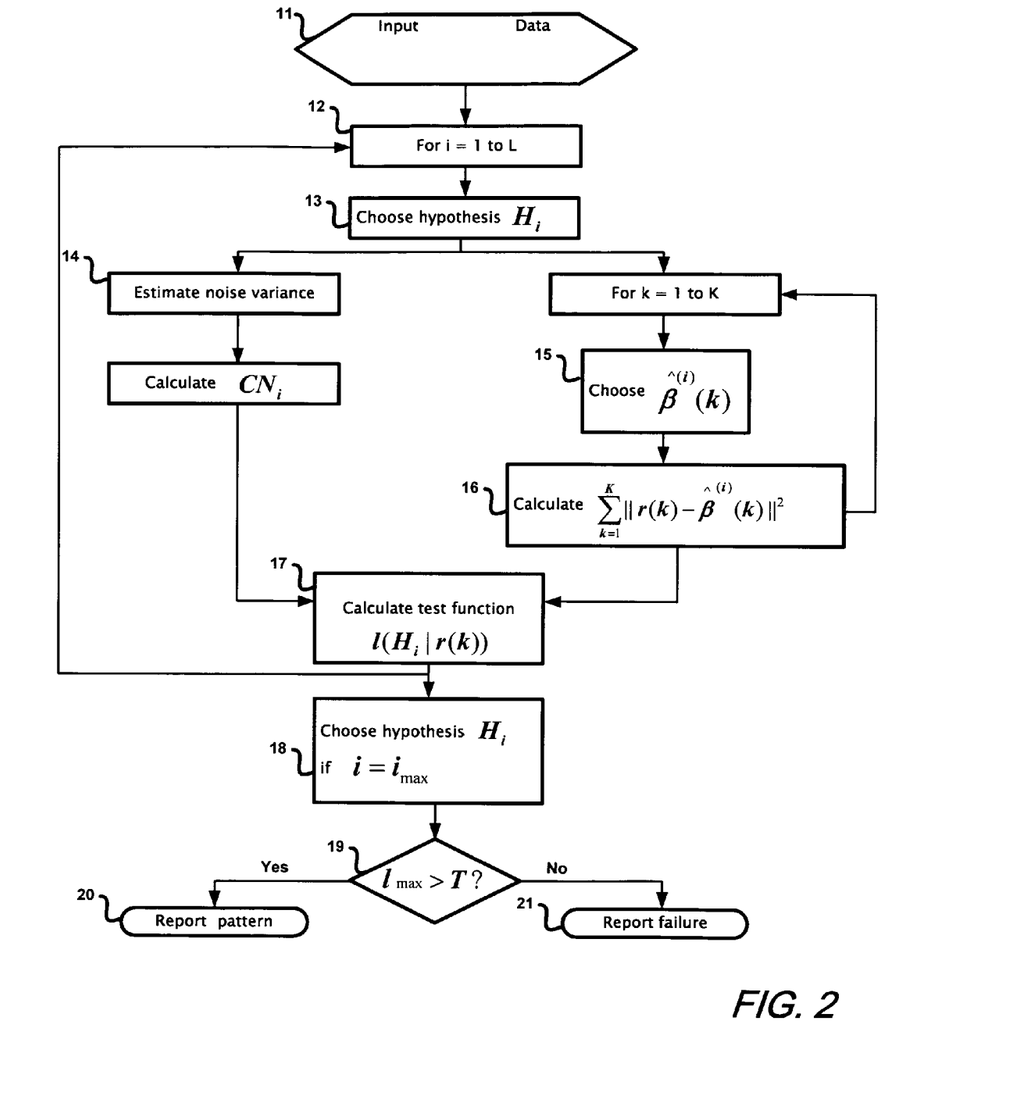
FIG. 2 is a processing flow chart depicting how the test function of the $i^{th}$ hypothesis $l(H_i|r(k))$ can be processed iteratively in accordance with the present invention.

Before providing a more detailed description of this invention's reduced complexity constellation pattern recognition and classification system for software-defined radios, it is necessary to better understand the constellation pattern recognition process and the test function of the $i^{th}$ hypothesis. Referring now to FIG. 2, which is a processing flow chart depicting the calculation of the test function $l(H_i|r(k))$ of the noisy input data r(k) by using the $i^{th}$ hypothesis $H_i$. We assume the number of constellation pattern candidates is L, which is represented by Block 12, and the $i^{th}$ (i=1, 2, ..., L) pattern candidate has $M_i$ constellation alphabets denoted by complex numbers $\{b_1^{(i)}, b_2^{(i)}, \ldots, b_{M_i}^{(i)}\}$. For comparison purposes, the powers of the alphabets have been normalized to unity, that is $$\sum_{j=1}^{M_i} (b_j^{(i)}(k))(b_j^{(i)}(k))^* = 1$$

where x* means the complex conjugate operation of the complex number x. A noisy observation, r(k), k=1, 2, ..., K, of the $i^{th}$ constellation alphabet, which is represented by the input data block 11, may be described by the expression:

$$r(k) = \beta^{(i)}(k) + n(k) \qquad (3)$$

where n(k) is white Gaussian noise with a standard deviation (std) σ, and where $\beta^{(i)}(k)$ is an unknown discrete random variable that is uniformly distributed over the alphabet set $\{b_1^{(i)}, b_2^{(i)}, \ldots, b_{M_i}^{(i)}\}$ with a zero mean value. The power of r(k) is also normalized to unity, i.e.

$$\sum_{k=1}^{K} (r(k))(r(k))^* = 1.$$

Then the joint logarithmic probability density function in Equation 2 can be rearranged to:

$$p(H_i|r(k)) = \frac{1}{M_i}\left\{\exp\left\{-\frac{\|r(k) - \beta^{(i)}(k)\|^2}{2\sigma^2}\right\} + \sum_{\substack{j=1 \\ b_j^{(i)} \neq \beta^{(i)}(k)}}^{M_i} \exp\left\{-\frac{\|r(k) - b_j^{(i)}\|^2}{2\sigma^2}\right\}\right\} \qquad (4)$$

$$= \frac{1}{M_i}\exp\left\{-\frac{\|r(k) - \beta^{(i)}(k)\|^2}{2\sigma^2}\right\}\left\{1 + \exp\left\{\frac{\|r(k) - \beta^{(i)}(k)\|^2}{2\sigma^2}\right\} \cdot \sum_{\substack{j=1 \\ b_j^{(i)} \neq \beta^{(i)}(k)}}^{M_i} \exp\left\{-\frac{\|r(k) - b_j^{(i)}\|^2}{2\sigma^2}\right\}\right\}$$

$$= \frac{1}{M_i}\exp\left\{-\frac{\|r(k) - \beta^{(i)}(k)\|^2}{2\sigma^2}\right\}\left\{\sum_{j=1}^{M_i}\exp\left\{\frac{\|r(k) - \beta^{(i)}(k)\|^2 - \|r(k) - b_j^{(i)}(k)\|^2}{2\sigma^2}\right\}\right\}$$

The logarithmic geometric probability density function of r(k), k=1, 2, K, can also be described by the expression:

$$L_s(H_i \mid r(k)) = \sum_{k=1}^{K} \log_e p(H_i \mid r(k)) \quad (5)$$

$$= \left( -K \cdot \log_e M_i - \frac{\sum_{k=1}^{K} \|r(k) - \beta^{(i)}(k)\|^2}{2\sigma^2} + \varepsilon(k, b_j^{(i)}) \right)$$

$$= \frac{1}{2\sigma^2} \left( -2\sigma^2 \cdot K \cdot \log_e M_i - \sum_{k=1}^{K} \|r(k) - \beta^{(i)}(k)\|^2 + 2\sigma^2 \varepsilon(k, b_j^{(i)}) \right)$$

where $$\varepsilon(k, b^{(i)}) = \sum_{k=1}^{K} \log_e \left\{ \sum_{j=1}^{M_i} \exp\left\{ \frac{\|r(k) - \beta^{(i)}(k)\|^2 - \|r(k) - b_j^{(i)}\|^2}{2\sigma^2} \right\} \right\} \quad (6)$$

Statistically, if the signal to noise ratio (SNR) increases, then the value of the term $\|r(k)-\beta^{(i)}(k)\|^2$ decreases and the value of the term $\|r(k)-b_j^{(i)}(k)\|^2$ increases. In radio communications, SNR is relatively high to insure the reliable data transmission. Hence a high SNR yields:

$$\|r(k)-b_j^{(i)}(k)\|^2 >> \|r(k)-\beta^{(i)}(k)\|^2 \text{ for } b_j^{(i)}(k) \neq \beta^{(i)}(k) \text{ and} \quad (1)$$

$$\|r(k)-b_j^{(i)}(k)\|^2 = \|r(k)-\beta^{(i)}(k)\|^2 \text{ for } b_j^{(i)}(k) = \beta^{(i)}(k) \quad (2)$$

so that the summation $$\sum_{j=1}^{M_i} \exp\left\{ \frac{\|r(k) - \beta^{(i)}(k)\|^2 - \|r(k) - b_j^{(i)}\|^2}{2\sigma^2} \right\} \approx 1$$

and the absolute value of $\epsilon(k,b^{(i)})$ become relatively small. Letting $M_i=2^{N_i}$, where $N_i$ is a positive integer, and neglecting the small nonlinear term $\epsilon(k,b^{(i)})$, it is now possible to establish a new likelihood test function with only linear dominant terms, as follows:

$$l(H_i \mid r(k)) = -\frac{2\sigma^2 K \cdot N_i}{\log_2 e} - \sum_{k=1}^{K} \|r(k) - \beta^{(i)}(k)\|^2, \quad (7)$$

Since the value of $\beta^{(i)}(k)$ is unknown, we use the estimated value $\hat{\beta}^{(i)}(k)$ obtained by using the nearest neighboring alphabet method. In other words, choose $\hat{\beta}^{(i)}(k)=b_j^{(i)}$ among alphabets $\{b_1^{(i)}, b_2^{(i)}, \ldots, b_{M_i}^{(i)}\}$ if $\|r(k)-b_j^{(i)}\|^2$ as a minimum, which is represented by Block 15. In Block 16 of the FIG. 2 flow chart, we calculate the average difference between r(k) and $\beta^{(i)}(k)$. Then, the likelihood test function, which is calculated in Block 17 becomes:

$$l_s(H_i \mid r(k)) = -C \cdot N_i - \sum_{k=1}^{K} \|r(k) - \hat{\beta}^{(i)}(k)\|^2, \quad (8)$$

where $$\hat{\beta}^{(i)}(k) = b_{j_{min}}^{(i)}, \; j_{min} = \arg\min_j \|r(k) - b_j^{(i)}\|^2,$$

and $$C = \frac{2\sigma^2 K}{\log_2 e} = 1.3863\sigma^2 K.$$

Thus, if the hypothesis $H_i$ is true, the $i^{th}$ likelihood function $l(H_i|r(k))$ will be the maximum among others, which is represented by Block 18. Mathematically, $$l_{max} = l(H_{max} \mid r(k)) \text{ and} \quad (9)$$

$$i_{max} = \arg\max_i \{l(H_i \mid r(k))\} \quad (10)$$

By choosing hypothesis i, which is represented by Block 18, to maximize the likelihood function $l(H_i|r(k))$, the index i indicates that the $i^{th}$ alphabet set is the best match for r(k). Therefore, the unknown pattern will be recognized by calculating $l(H_i|r(k))$ from i=1, 2, L, and choosing the maximum value among them. Finally the maximum value $l_{max}$ is compared to a threshold T, chosen by the user, which is represented by Block 19, to determine the success or failure of the constellation pattern classification. If the $l_{max}$ is larger than T, the test is successful and the pattern test result will be reported, as represented by Block 20, in order to pass the classification result to the other process such as a signal demodulator of the software-defined radio. Otherwise, the test is failed since the test result has low confidence level and it should not be trusted and used, which is represented by Block 21, and this means the classification does not work. When these techniques are applied to this invention's modulation classification devices and methods, the various types of the constellation patterns are then used to determine the modulation schemes of the communication signals.

In Equation 8, r(k), k=1, 2, . . . , K is a block of input data, $\sigma^2$ and $\hat{\beta}^{(i)}(k)$ can be estimated using r(k), Blocks 14 and 15. Therefore, C is a fixed number for a given block of input data, and there is no exponential or logarithmic operation in calculating test function $l(H_i|r(k))$. Thus, computational complexity is largely reduced and the processing is much more rapid than in prior art arrangements which could significantly improve performance of the software-defined radio.

In accordance with the present invention, an alternative form for the test function in Equation 8 is:

$$l(H_i \mid r(k)) = -C \cdot N_i + \left[ \sum_{k=1}^{K} r(k)\hat{\beta}^{(i)}(k) - \sum_{k=1}^{K} \hat{\beta}^{(i)}(k)\hat{\beta}^{(i)}(k) \right] \quad (11)$$

Figure 3:
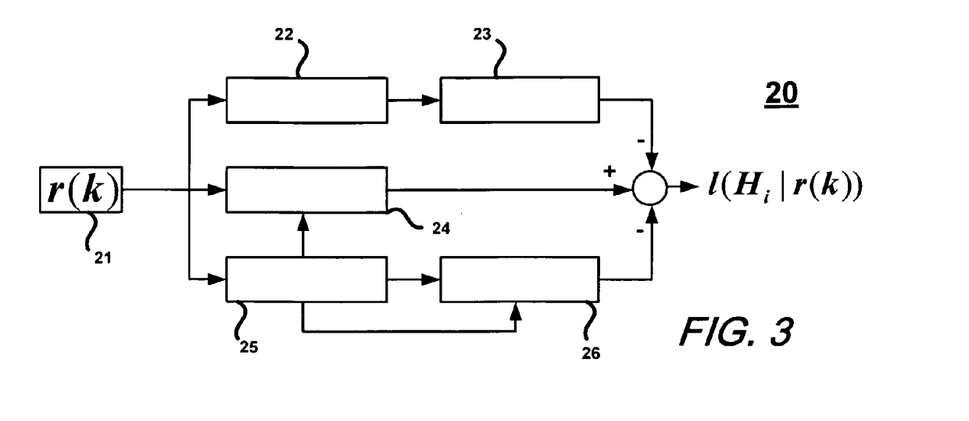
FIG. 3 is a block diagram depicting the key aspects of parallel processing for the test function $l(H_i|r(k))$ in accordance with the present invention.
Figure 4:
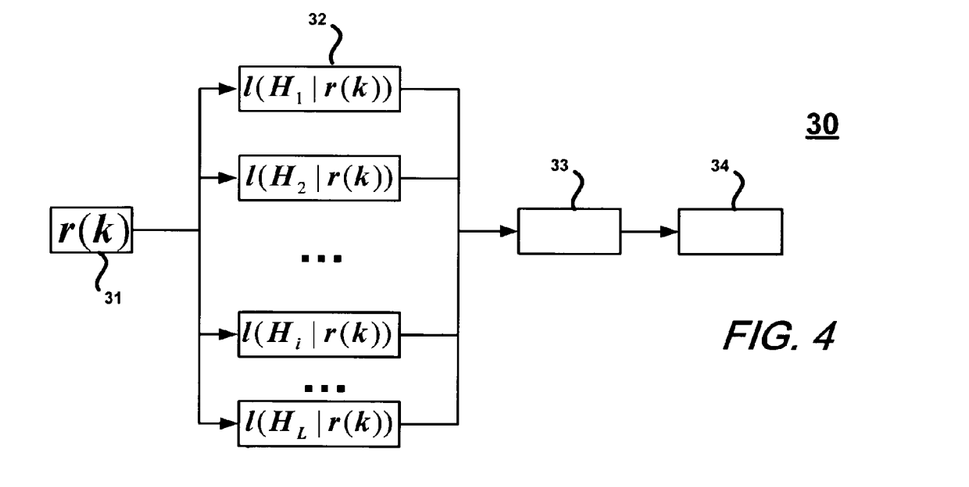
FIG. 4 is a block diagram depicting the key aspects of parallel processing for choosing the maximum value $l_{max}$ which is used for classifying the constellation patterns in accordance with the present invention.

Defining
r=[r(1) r(2) . . . r(K)]$^T$ and
$\hat{\beta}^{(i)}$=[$\hat{\beta}^{(i)}(1)$ $\hat{\beta}^{(i)}(2)$ . . . $\hat{\beta}^{(i)}(K)$]$^T$
where x$^T$ is the transpose of x, Equation 8 then becomes:

$$l(H_i \mid r(k)) = -C \cdot N_i + r^T \cdot \hat{\beta}^{(i)} - \hat{\beta}^{(i)T} \cdot \hat{\beta}^{(i)} \quad (12)$$

which can be advantageously implemented in communications hardware and devices as shown in FIGS. 3 and 4. The FIG. 3 block diagram illustrates the operations of the Equation 12 formula and the FIG. 4 block diagram illustrates the operations of Equation 10.

FIG. 3 is a block diagram illustrating a top-level view of parallel processing to calculate the test function $l(H_i|r(k))$ in accordance with the present invention. Referring now to FIG. 3, there is depicted a flow diagram of this invention's reduced complexity constellation pattern recognition and classification device 20, comprising an r(k) input 21, a means for estimating $\sigma^2$ 22 using a digital signal processor, a means for calculating $CN_i$ 23 using add and multiply components, a means for calculating $r^T \cdot \hat{\beta}^{(i)}$ 24 using dot product or multiply accumulate component, a means for estimating $\hat{\beta}^{(i)}$ 25 using a lookup table stored in memory or digital signal processor, and a means for calculating $\hat{\beta}^{(i)T} \cdot \hat{\beta}^{(i)}$ 26 using dot product or multiply accumulate component. In operation, this invention's constellation pattern recognition and classification device 20 performs the likelihood function computation for the hypothesis $H_i$. The hardware components can be implemented using digital signal processors or field-programmable gate array (FPGA) components based on the design requirement in processing speed, material expenses, and physical size. Other variations applicable to this embodiment include the test function selection means performing a likelihood function computation, the likelihood function computation selecting the optimal likelihood test function, the modulation scheme for the unknown constellation pattern allowing an enhanced level of performance, the apparatus being implemented with a group of software programs, and having a storage medium encoded with machine-readable computer program code.

FIG. 4 is a block diagram depicting the key aspects of parallel processing for choosing the maximum value of $l_{max}$ used for classifying constellation patterns in accordance with the present invention. Referring now to FIG. 4, there is depicted a flow diagram of this invention's simplified, highly accurate, and real-time constellation pattern recognition and classification article of manufacture for a software-defined communications system 30, comprising an r(k) input 31, a group of parallel test functions 32 implemented by device 20 in FIG. 3, a means for selecting the optimal test function 33, and a means for classifying a pattern 34. Blocks 33 and 34 can be implemented by using digital signal processors or FPGA components based on the procedure described in Blocks 18-21 in FIG. 2. In operation, this invention's other embodiment of the constellation pattern recognition and classification device 30 searches for the winner among L hypotheses computed by device 20 in order to determine the best constellation patterns to fit the noisy input. Variations applicable to this embodiment include a group of calculations being performed in parallel instead of sequentially, a means for digital signal processing, determining a value of $N_i$ for a maximum likelihood test, and the value of $N_i$ preventing a nested hypotheses in said maximum likelihood test.

It should be noted that computations according to the new devices and methods of this invention are much simpler and faster than the prior art ALRT technique since the variance $\sigma^2$ in the first term of Equation 8 can now be computed either before or after the summation calculation of the second term so that the prior art ALRT sequential processing can now be performed in a parallel manner. Further, the function $CN_i$ is a known value that can be calculated off-line.

It is even more remarkable to note that the value of $N_i$ is used to prevent the nested hypotheses in the maximum likelihood test. For example, referring back to FIGS. 1A and 1B, BPSK and QPSK share the same constellation alphabets 0.707+j0.707 and −0.707−j0.707, so that the value of $$\sum_{k=1}^{K} \|r(k) - \hat{\beta}^{(i)}(k)\|^2$$

in Equation 8 for these two hypotheses is the same, and the test can not be performed depending on the value of $$\sum_{k=1}^{K} \|r(k) - \hat{\beta}^{(i)}(k)\|^2$$

due to the nested hypothesis. However, the values of $N_i$ are different for these two hypotheses, which equals 1 for BPSK and equals 2 for QPSK. Therefore, the hypothesis of BPSK yields the maximum $l(H_i|r(k))$ and BPSK passes the test. Further, the value of $\sigma$ adds weight in the test function $l(H_i|r(k))$ to reflect the confidence in the test. If the input data is noisy, the value of $\sigma$ becomes large. Therefore the term $CN_i$ becomes large and the term $$\sum_{k=1}^{K} \|r(k) - \hat{\beta}^{(i)}(k)\|^2$$

becomes less dominant. This yields a smaller $l_{max}$ which means the confidence of the test result is low and it may be eliminated by the threshold test. Therefore it can be calculated before the test process. This new technique is not limited to BPSK, QPSK, and 16 QAM and successfully performs for any of the modulation schemes which can be described by a constellation.

The invention proposed a simple and fast processing method to classify the constellation patterns. The invention makes the process much simpler since it eliminates all exponential and logarithmic calculations. It also reduces additions and multiplications. Comparing the prior art in Equations 1 and 2 with the new method in Equation 8, the calculation in Equation 2 for calculating the test function of one hypothesis requires approximately 4MK additions/subtractions, (3M+1)K multiplications/divisions, and (M+1)K exponential/logarithmic operations. The calculation in Equation 8 only requires approximately (3M+1)K additions/subtractions, 2MK multiplications/divisions, and K minimization operations. The new method operates much faster because it has a simpler structure and is more suitable for parallel processing design.

Figure 5:
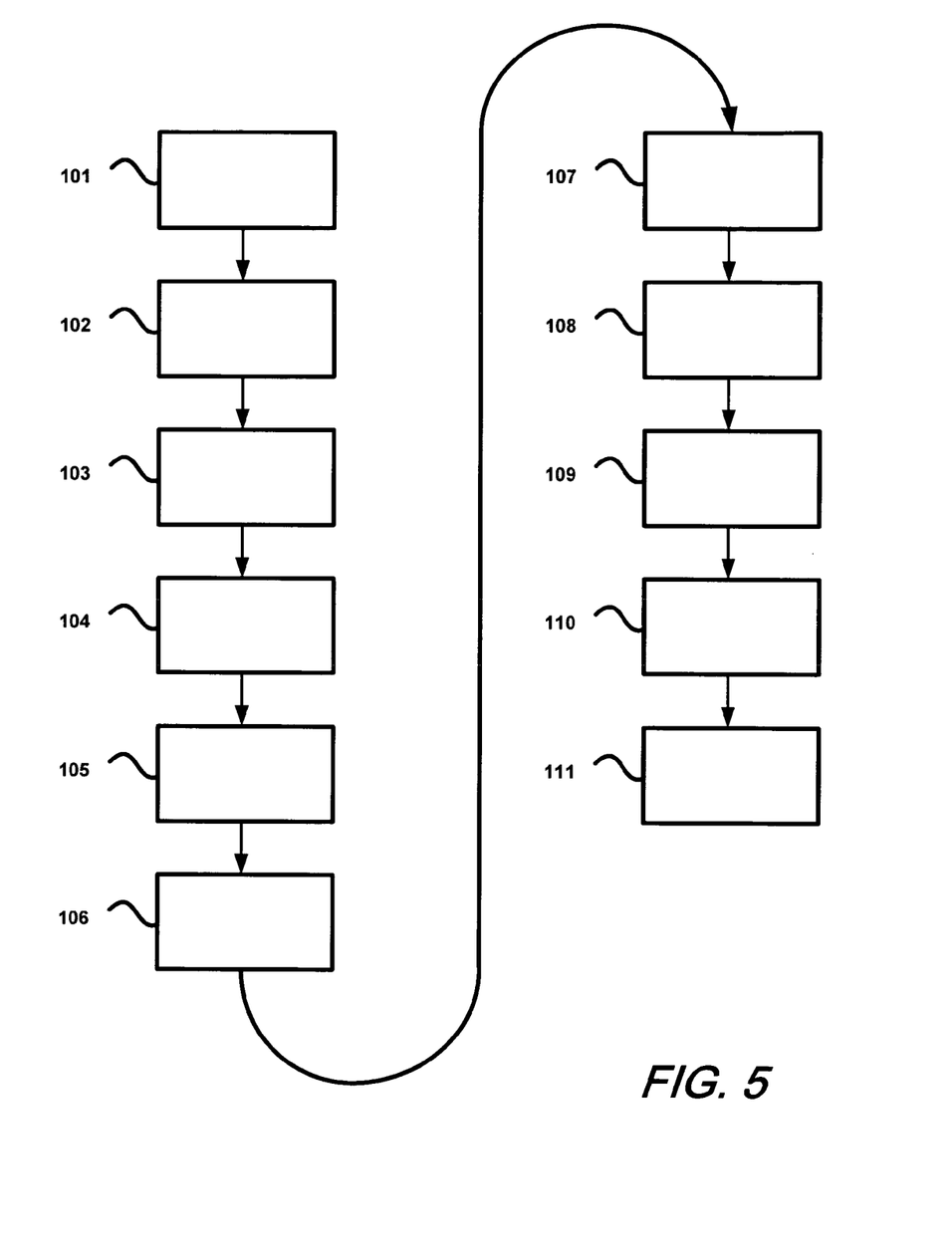
FIG. 5 depicts the steps of the method for rapid, highly accurate, and real-time reduced complexity constellation pattern recognition and classification in accordance with the present invention.

Referring now to FIG. 5, there is depicted the steps of the method for highly accurate and real-time reduced complexity constellation pattern recognition and classification for a software-defined communications system, comprising the steps of providing an r(k) noisy input having an unknown constellation pattern, which is represented by Block 101; estimating a function $\sigma^2$ with a digital signal processor, Block 102, the digital signal processor having a stored look-up table, a means for selecting test functions, and a means for classifying a pattern; computing a function $CN_i$ with a means for calculating using a group of add and multiply components, which is represented by Block 103; calculating a function $r^T \cdot \hat{\beta}^{(i)}$ with the calculating means using a dot product component; estimating a function $\hat{\beta}^{(i)}$ with a means for estimating using the lookup table, Block 104; and computing a function $\hat{\beta}^{(i)T} \cdot \hat{\beta}^{(i)}$ with the calculating means using the dot product component, which is represented by Block 105. This invention's method continues with the steps of comparing the functions with the calculating means and the estimating means, which is represented by Block 106; determining a group of parallel likelihood test functions for an $i^{th}$ hypothesis $H_i$ with the calculating means, Block 107; performing a likelihood function computation with the test function selection means to select an optimal likelihood test function from the group of parallel test functions, which is represented by Block 108; rapidly detecting the optimal likelihood test function and the $i^{th}$ hypothesis $H_i$ with the pattern classification means to rapidly detect the unknown constellation pattern with a reduced level of computational complexity, Block 109; determining a modulation scheme and an optimal constellation pattern to best fit the noisy input, Block 110; and providing an enhanced level of performance for the software-defined communications system, which is represented by Block 111. Variations applicable to this invention's method include performing a plurality of calculations in parallel instead of sequentially, connecting a means for digital signal processing, determining a value of $N_i$ for a maximum likelihood test, preventing a nested hypothesis in the maximum likelihood test with the value of $N_i$, implementing the method with a group of software programs, and configuring a storage medium encoded with machine-readable computer program code.

It is to be further understood that other features and modifications to the foregoing detailed description are within the contemplation of the present invention, which is not limited by this detailed description. Those skilled in the art will readily appreciate that any number of configurations of the present invention and numerous modifications and combinations of materials, components, arrangements, and dimensions can achieve the results described herein, without departing from the spirit and scope of this invention. Accordingly, the present invention should not be limited by the foregoing description, but only by the appended claims.

What I claim is:

1. A simplified constellation pattern recognition and parallel processing classification apparatus for a software-defined communications device, comprising:
    an r(k) noisy input data having an unknown constellation pattern, where k=1, 2, ..., K;
    a digital signal processor estimates a function $\sigma^2$, where $\sigma$ is a standard deviation (std) of the white Gaussian noise n(k);
    said digital signal processor having a stored look-up table, a means for selecting test functions, and a means for classifying a pattern;
    a means for calculating computes a function $CN_i$ using a plurality of add and multiply components, where $N_i$ is a positive number and where $$C = \frac{2\sigma^2 K}{\log_2 e} = 1.3863\sigma^2 K;$$

said calculating means computes a function $r^T \cdot \hat{\beta}^{(i)}$ using a dot product component, where T is a threshold chosen by the user and where $\beta^{(i)}(k)$ is an unknown discrete random variable that is uniformly distributed over the alphabet set $\{b_1^{(i)}, b_2^{(i)}, \ldots, b_{M_i}^{(i)}\}$ with a zero mean value;
    a means for estimating estimates a function $\hat{\beta}^{(i)}$ using said lookup table;
    said calculating means computes a function $\hat{\beta}^{(i)T} \cdot \hat{\beta}^{(i)}$ using said dot product component;
    said calculating means and said estimating means compare said functions;
    said calculating means to determines a plurality of parallel likelihood test functions for an $i^{th}$ hypothesis $H_i$, where i=1, 2, ..., L;
    said test function selection means selects an optimal likelihood test function from said plurality of parallel test functions; and
    said pattern classification means uses said optimal likelihood test function and said $i^{th}$ hypothesis $H_i$ to rapidly detect said unknown constellation pattern with a reduced level of computational complexity to determine a modulation scheme for said unknown constellation pattern.

2. The simplified constellation pattern recognition and parallel processing classification apparatus for said software-defined communications device, as recited in claim 1, further comprising said test function selection means performs a likelihood function computation to select said optimal likelihood test function.

3. The simplified constellation pattern recognition and parallel processing classification apparatus for said software-defined communications device, as recited in claim 2, further comprising a means for digital signal processing.

4. The simplified constellation pattern recognition and parallel processing classification apparatus for said software-defined communications device, as recited in claim 3, further comprising determining said modulation scheme for said unknown constellation pattern allows an enhanced level of performance for said software-defined communications device.

5. The simplified constellation pattern recognition and parallel processing classification apparatus for said software-defined communications device, as recited in claim 4, further comprising said apparatus being implemented with a plurality of software programs.

6. The simplified constellation pattern recognition and parallel processing classification apparatus for said software-defined communications device, as recited in claim 5, further comprising a storage medium encoded with a machine-readable computer program code.

7. A simplified, highly accurate, and real-time constellation pattern recognition and classification article of manufacture with a storage medium encoded with a machine-readable computer program code for a software-defined communications system, comprising:
    an r(k) noisy input data having an unknown constellation pattern, where k=1, 2, ..., K;
    a digital signal processor estimates a function $\sigma^2$, where $\sigma$ is a standard deviation (std) of the white Gaussian noise n(k);
    said digital signal processor having a stored look-up table, a means for selecting test functions, and a means for classifying a pattern;
    a means for calculating computes a function $CN_i$ using a plurality of add and multiply components, where $N_i$ is a positive number and where $$C = \frac{2\sigma^2 K}{\log_2 e} = 1.3863\sigma^2 K;$$

said calculating means computes a function $r^T \cdot \hat{\beta}^{(i)}$ using a dot product component, where T is a threshold chosen by the user and where $\beta^{(i)}(k)$ is an unknown discrete random variable that is uniformly distributed over the alphabet set $\{b_1^{(i)}, b_2^{(i)}, \ldots, b_{M_i}^{(i)}\}$ with a zero mean value;

a means for estimating estimates a function $\hat{\beta}^{(i)}$ using said lookup table;

said calculating means computes a function $\hat{\beta}^{(i)T} \cdot \hat{\beta}^{(i)}$ using said dot product component;

said calculating means and said estimating means compare said functions;

said calculating means to determines a plurality of parallel likelihood test functions for an $i^{th}$ hypothesis $H_i$, where $i=1, 2, \ldots, L$;

said test function selection means performs a likelihood function computation to select an optimal likelihood test function from said plurality of parallel test functions; and said pattern classification means uses said optimal likelihood test function and said $i^{th}$ hypothesis $H_i$ to rapidly detect said unknown constellation pattern with a reduced level of computational complexity, determine a modulation scheme and an optimal constellation pattern to best fit said noisy input, and provide an enhanced level of performance for said software-defined communications system.

8. The simplified, highly accurate, and real-time constellation pattern recognition and classification article of manufacture for said software-defined communications system, as recited in claim 7, further comprising a plurality of calculations being performed in parallel instead of sequentially.

9. The simplified, highly accurate, and real-time constellation pattern recognition and classification article of manufacture for said software-defined communications system, as recited in claim 8, further comprising a means for digital signal processing.

10. The simplified, highly accurate, and real-time constellation pattern recognition and classification article of manufacture for said software-defined communications system, as recited in claim 9, further comprising a value of $N_i$ being determined for a maximum likelihood test.

11. The simplified, highly accurate, and real-time constellation pattern recognition and classification article of manufacture for said software-defined communications system, as recited in claim 10, further comprising said value of $N_i$ preventing a nested hypotheses in said maximum likelihood test.

12. A method for highly accurate and real-time reduced complexity constellation pattern recognition and classification for a software-defined communications system, comprising the steps of:

providing an r(k) noisy input data having an unknown constellation pattern, where $k=1, 2, \ldots, K$;

estimating a function $\sigma^2$ with a digital signal processor, where $\sigma$ is a standard deviation (std) of the white Gaussian noise n(k);

said digital signal processor having a stored look-up table, a means for selecting test functions, and a means for classifying a pattern;

computing a function $CN_i$ with a means for calculating using a plurality of add and multiply components, where $N_i$ is a positive number and where $$C = \frac{2\sigma^2 K}{\log_2 e} = 1.3863\sigma^2 K;$$

calculating a function $r^T \cdot \hat{\beta}^{(i)}$ with said calculating means using a dot product component, where T is a threshold chosen by the user and where $\beta^{(i)}(k)$ is an unknown discrete random variable that is uniformly distributed over the alphabet set $\{b_1^{(i)}, b_2^{(i)}, \ldots, b_{M_i}^{(i)}\}$ with a zero mean value;

estimating a function $\hat{\beta}^{(i)}$ with a means for estimating using said lookup table;

computing a function $\hat{\beta}^{(i)T} \cdot \hat{\beta}^{(i)}$ with said calculating means using said dot product component;

comparing said functions with said calculating means and said estimating means;

determining a plurality of parallel likelihood test functions for an $i^{th}$ hypothesis $H_i$ with said calculating means, where $i=1, 2, \ldots, L$;

performing a likelihood function computation with said test function selection means to select an optimal likelihood test function from said plurality of parallel test functions;

rapidly detecting said optimal likelihood test function and said $i^{th}$ hypothesis $H_i$ with said pattern classification means to rapidly detect said unknown constellation pattern with a reduced level of computational complexity; and determining a modulation scheme and an optimal constellation pattern to best fit said noisy input, and provide an enhanced level of performance for said software-defined communications system.

13. The method for highly accurate and real-time reduced complexity constellation pattern recognition and classification for said software-defined communications system, as recited in claim 12, further comprising the step of performing a plurality of calculations in parallel instead of sequentially.

14. The method for highly accurate and real-time reduced complexity constellation pattern recognition and classification for said software-defined communications system, as recited in claim 13, further comprising connecting a means for digital signal processing.

15. The method for highly accurate and real-time reduced complexity constellation pattern recognition and classification for said software-defined communications system, as recited in claim 14, further comprising the step of determining a value of $N_i$ for a maximum likelihood test.

16. The method for highly accurate and real-time reduced complexity constellation pattern recognition and classification for said software-defined communications system, as recited in claim 15, further comprising the step of preventing a nested hypothesis in said maximum likelihood test with said value of $N_i$.

17. The method for highly accurate and real-time reduced complexity constellation pattern recognition and classification for said software-defined communications system, as recited in claim 16, further comprising the step of implementing said method with a plurality of software programs.

18. The method for highly accurate and real-time reduced complexity constellation pattern recognition and classification for a software-define communications system, as recited in claim 17, further comprising the step of configuring a storage medium encoded with a machine-readable computer program code.

* * * * *